United States Patent [19]

Lewis et al.

[11] Patent Number: 5,639,707
[45] Date of Patent: Jun. 17, 1997

[54] PROCESS FOR THE STORAGE OF METHANE WITH ACTIVATED CARBON

[75] Inventors: Irwin Charles Lewis, Strongsville; Ronald Alfred Greinke, Medina, both of Ohio

[73] Assignee: UCAR Carbon Technology Corporation, Danbury, Conn.

[21] Appl. No.: 670,142

[22] Filed: Jun. 27, 1996

Related U.S. Application Data

[60] Continuation of Ser. No. 223,824, Apr. 6, 1994, abandoned, which is a division of Ser. No. 880,076, May 5, 1992, abandoned.

[51] Int. Cl.$^6$ .................................................. B01J 20/02
[52] U.S. Cl. ............................. 502/423; 502/416; 95/143
[58] Field of Search .................................. 502/416, 423; 95/143

[56] References Cited

U.S. PATENT DOCUMENTS

| | | | |
|---|---|---|---|
| 1,694,040 | 12/1928 | Ray et al. | 502/425 |
| 1,819,165 | 8/1931 | Hass | 502/425 |
| 2,585,454 | 2/1952 | Gamson | 502/423 |
| 3,248,303 | 4/1966 | Doyiny | 502/423 |
| 3,305,315 | 2/1967 | Bacon et al. | 23/209.1 |
| 3,862,962 | 1/1975 | Hanamura et al. | 502/423 |
| 3,886,088 | 5/1975 | DeJong | 502/423 |
| 4,024,076 | 5/1977 | Miyake et al. | 502/423 |
| 5,102,855 | 4/1992 | Greinke et al. | 502/426 |

OTHER PUBLICATIONS

Wiesenfeld, Accounts of Chemical Research, vol. 15, pp. 110–116, 1982. (no month).

Polymerization of Aromatic Hydrocarbons with sulfur, I.C. Lewis and R.A. Greinke (J. Poly. Sci. Polymer Ed. 20, 1199 (1982) (no month).

*Primary Examiner*—Steven Bos
*Assistant Examiner*—Thomas G. Dunn, Jr.
*Attorney, Agent, or Firm*—Frederick J. McCarthy

[57] ABSTRACT

A sulfur-containing active carbon, which has a high storage capacity for methane, is produced from inexpensive aromatic precursors, such as chrysene, coal tar and petroleum oils, tars and pitches, by reacting the aromatic precursor with elemental sulfur, followed by carbonization of the sulfur-containing reaction product in an inert atmosphere at an elevated temperature to produce a sulfur-containing carbon. The carbon is then further activated to develop a surface area of at least 600 m$^2$/g by heating in an oxidizing atmosphere at an elevated temperature.

1 Claim, No Drawings

PROCESS FOR THE STORAGE OF METHANE WITH ACTIVATED CARBON

This application is a continuation of prior U.S. application Ser. No. 08/223,824, filed Apr. 6, 1994 now abandoned which is a divisional of application Ser. No. 07/880,076 filed May 5, 1992 now abandoned.

FIELD OF THE INVENTION

The invention relates to a sulfur-containing high surface area activated carbon produced from aromatic hydrocarbon precursors, such as polynuclear aromatic hydrocarbons, pitches, oils and tars by reacting a polynuclear aromatic hydrocarbon precursor with elemental sulfur, followed by carbonization in an inert atmosphere at 450° C. to 1000° C. to produce a sulfur-containing coke product, and then preferably activation of the sulfur-containing product in an oxidizing atmosphere, such as steam or air, at a temperature of at least 500° C.

BACKGROUND OF THE INVENTION

Activated carbon can be used for adsorption purposes, such as the extraction of gases or vapors from products, for adsorption of liquids and for solvent recovery in various applications. One process used in producing highly active gas adsorbent carbon consists of charring carbonaceous material, such as coconut shells, by application of heat and the further treatment of the carbon so produced with an oxidizing agent such as steam which slowly oxidizes the carbon.

U.S. Pat. No. 1,694,040 discloses a process for making dense strong activated charcoal by impregnating nut cellulose with a dehydrating agent, such as phosphoric acid or zinc chloride, heating the mixture to a temperature not materially below 350° C., leaching out the soluble components and then reheating the resulting carbon in an oxidizing atmosphere.

U.S. Pat. No. 1,819,165 discloses a process for producing highly active gas adsorbent carbon by impregnating carbonaceous material with phosphoric acid, then calcining said impregnated material in the absence of oxygen and then submitting the calcined product to controlled partial oxidation at temperatures above 700° C.

U.S. Pat. No. 3,305,314 discloses a process for producing permanently dehydrated heat treated material from a cellulosic textile material which comprises subjecting the cellulosic material to a controlled partial and selective decomposition of the cellulosic molecule by immersing the cellulosic material in an acid solution to wet the material therewith, removing the wet material from the solution, drying the material to remove the solvent therefrom and heat treating the dried material in an oxidizing atmosphere whereby decomposition involves a rupture of the carbon-oxygen and carbon-hydrogen bonds and the evolution of water, but falling just short of the scission of the main cellulose molecule, through the rupture of the carbon-carbon bonds with the evolution of hydrogen.

U.S. Pat. No. 5,102,855 discloses a process for producing activated carbon, preferably high surface area activated carbon, from inexpensive cellulosic precursors, such as paper, by pretreating the cellulosic precursor with an activating agent, such as phosphoric acid, followed by carbonization in an inert atmosphere at an elevated temperature to produce activated carbon. The activated carbon can be further activated to increase its surface area by heating it in an oxidizing atmosphere at an elevated temperature to yield activated carbon having a surface area of at least 1000 m$^2$/g.

Although active carbon has been used extensively in gas and vapor adsorption devices, it is also well suited for the storage of gases such as methane. One of the best active carbons for the storage of methane is derived from chemical activation of coke. These carbons have very high surface areas (2500 to 3000 m$^2$/g) and are costly to produce.

It is an object of the present invention to provide a relatively low cost process for producing high surface area carbons, preferably high surface area activated carbons, from inexpensive aromatic hydrocarbon precursors.

It is another object of the present invention to produce activated carbons, preferably high surface area activated carbons, that can be utilized in storage containers to more efficiently store gases such as methane, hydrogen and natural gas.

It is another object of the present invention to provide a process for producing high surface area activated carbon that is cost effective to produce and easy to practice.

It is another object of the present invention to produce an active carbon with a controlled porosity and with a high polarity which increases the interaction of the carbon with gases such as methane in order to allow more efficient gas storage.

SUMMARY OF THE INVENTION

The invention relates to a process for producing a sulfur-containing carbon product which is preferably activated and comprises the following steps:

a) at an elevated temperature reacting at least one carbonizable liquid or carbonizable melted solid selected from the group consisting of polynuclear aromatic hydrocarbons, pitches, oils and tars with elemental sulfur in an amount of 10 to 40 percent by weight based on the weight of the selected carbonizable material to obtain a polymeric reaction product containing sulfur; and b) heating the reaction product of step a) at a temperature from 450° C. to 1000° C. in an inert atmosphere to produce a sulfur-containing coke.

To develop a high surface area in the sulfur-containing coke product, the following activating step is included:

c) heating the sulfur-containing coke material of step b) at a temperature of at least 500° C. in an oxidizing atmosphere to produce activated carbon preferably having a surface area of at least 600 m$^2$/g. In the practice of step c), the inert atmosphere of step b) can be replaced by an oxidizing atmosphere and the heating continued.

As used herein, a polynuclear aromatic hydrocarbon precursor shall mean an aromatic hydrocarbon which contains at least two condensed rings. Preferably the aromatic precursors are hydrocarbons such as anthracene, chrysene and pyrene or complex aromatic hydrocarbon and heterocyclic mixtures derived from petroleum and coal tar refining including: coal tars, coal tar oils, coal tar pitches, petroleum gas oils and petroleum pitches with petroleum and coal tar oils being the most preferred.

In step a) of the above-described process, the aromatic precursor, such as chrysene or a decant oil, is mixed with elemental sulfur in an amount of 10 to 40 percent by weight of the hydrocarbon in the mixture and the mixture constituents are reacted by heating the mixture in either air or in an inert atmosphere at a temperature of 150° C. to 300° C. for about 30 to 600 minutes to obtain a polymeric reaction product containing sulfur. The resulting polymeric reaction product is in the form of a non-planar ladder polymer containing sulfur in relatively high amounts, e.g. 5 to 20% by weight of the product and is described in Polymerization of Aromatic Hydrocarbons with Sulfur, I. C. Lewis and R. A. Greinke (J. Poly Sci., Polym. Ed. Edition, 20, 1199 (1982)) which is incorporated herein by reference. The sulfur contained in the reaction product bridges between aromatic rings of the polymeric material. A portion of the elemental sulfur is also released as hydrogen sulfide gas during the polymerization reaction. Typically about one half of the initial sulfur is retained as part of the polymeric reaction product. On further heat treatment of the sulfur-containing material in the range of 450°–1000° C., in an inert, e.g. nitrogen or argon, atmosphere, carbonization occurs and carbons containing high concentrations of sulfur (5% to 15% by weight) are produced. Activation of such high sulfur materials in an oxidizing atmosphere produces an activated sulfur carbon having a high surface area of at least 600 $m^2$/gm, preferably at least 1000 to 1200 $m^2$/g, and the sulfur-containing active carbon is characterized by a high methane loading of at least 4 mmole/gm carbon at 500 psi. Other chemical activation procedures known in the art such as heat treatment with solid alkali hydroxides or inorganic acids can also be used to develop the high surface area but the gaseous activation procedure is preferred. The ladder structure of the product prevents the planar stacking of carbon layers and leads to porosity between the carbon layers, resulting in a coke highly favorable for storage of methane or for other active carbon applications. In addition the sulfur constituent increases the polarity of the carbon and promotes the interaction with methane.

In the preferred embodiment, the carbonization treatment in step b) hereinabove is suitably carried out in any inert atmosphere, such as nitrogen or argon, at a temperature from 450° C. to 1000° C., preferably from 500° C. to 650° C. and more preferably from 500° C. to 550° C. In this step, the aromatic hydrocarbon sulfur polymer is carbonized and produces high sulfur containing carbon with a non-planar structure suitable for subsequent activation. The sulfur carbon has an internal closed porosity suitable for the production of an efficient active carbon. In the carbonization treatment step, the heating should be maintained for a sufficient period of time to assure proper carbonization, i.e, at least 5 minutes at 550° C. Generally a time period of at least 5 minutes is sufficient with a time period of 5 minutes to 5 hours being preferred and a time period of 15 minutes to 2 hours being most preferred. The time period is dependent on the temperature of the treatment with the higher temperature requiring a shorter time period and thus for optimum results, an appropriate heat treatment temperature and time period can be selected.

The carbonized material produced in step b) can subsequently be activated in an oxidizing atmosphere for a time period at an elevated temperature sufficient to produce activated carbon having a surface area of 600 $m^2$/g, preferably at least 1000 $m^2$/g and more preferably at least 1100 $m^2$/g. Preferably, this treatment of the carbon material is performed by maintaining the carbon at a temperature above 700° C., and preferably above 800° C. while in contact with an oxidizing environment, such as steam, to preferably burn off and remove at least 40% by weight of the carbon. Generally, a time period of from 10 minutes to 48 hours would be sufficient. Although the preferred activation step c) can be carried out using steam, it can also be carried out with $CO_2$, air, mixtures of $CO_2$ with steam and/or air as well as other physical and chemical activation procedures which are known in the art. The sulfur content of the product resulting from this further activation step is from 4 to 10% by weight of the resultant product and has a methane loading of at least 4 mmole/gm at 500 psi, or a maximum loading at infinite pressure of at least 5.5 mmole/gm. The activation procedure opens up the internal porosity and makes it accessible for storage of gases such as methane.

The high surface area, activated, sulfur-containing carbon thus produced is ideally suited for use in containers that can be used to store gases such as methane, hydrogen and natural gas. The activated carbon product can be mixed with a suitable binder, such as a clay, starch, molasses or resins, to form rigid objects which can be utilized to fabricate articles of various shapes and sizes. Due to the relatively high surface area and high bulk density of the activated sulfur-containing carbon produced, a vessel using this material can adsorb a high volume of gas, e.g. methane, per volume of carbon. Although this high surface area activated carbon is ideally suited for use in gas storage containers, it also will be ideally suited for use in devices for adsorbing gases and vapors such as purifiers, deodorizers, dechlorinators, detoxicators and the like.

EXAMPLE 1

A gas oil distillate from the coking of petroleum residue, in the amount of 45 g was heated in a resin flask with 15 g of solid sulfur at 300° C. for one hour under an argon atmosphere. A polymeric pitch product was obtained in a yield of 65% based on the combined weight of distillate and sulfur. The product contained 8.7% by weight sulfur and had a carbon yield of 42%. The pitch was then heated in an inert (argon) atmosphere, from room temperature to 550° C. over a period of 30 minutes and held at 550° C. for about 2 hours to obtain a coke in 42% yield containing 9.2% by weight S as determined by x-ray analysis. The coke product was then placed in a ceramic boat and heated rapidly to 850° C. in a steam/argon atmosphere and maintained at these conditions for 24 hours. The active carbon product had a surface area of 1231 $m^2$/g and contained 6.0% by weight S as determined by x-ray analysis.

EXAMPLE 2

A petroleum decant oil was distilled to give a distillate boiling below about 350° C. The distillate in an amount of 45 g was reacted with 15 g sulfur at 300° C. for 6 hours as in Example 1 to produce a polymer pitch product in 78% yield (based on total weight of distillate plus sulfur). The pitch product has a Mettler softening point of 186° C. and gave a carbon yield of 41% and contained 6.6% by weight sulfur. The pitch product was then coked at 500° C. as in Example 1. The overall carbon yield of the coke was 40% based on the original weight of the pitch product and the coke contained 7.2% by weight sulfur based on x-ray analysis. The coke was activated similar to Example 1 by treatment with a steam/argon mixture for 48 hours at 850° C. The active carbon obtained in a carbon yield of 47% and contained 6.6% by weight S as determined by x-ray analysis and had a surface area of 1125 $m^2$/g.

EXAMPLE 3

A mixture of 10 grams of solid sulfur and 30 grams of the aromatic hydrocarbon chrysene was heated at 350° C. for five hours in a resin flask under an argon atmosphere. A polymerized pitch product was obtained in 75% yield (based on starting weight of chrysene+sulfur). The pitch product has a Mettler softening point of 190° C. and gave a carbon yield of 65% and contained 16.8% sulfur as determined by x-ray analysis. The product was then converted to coke by heating in a ceramic boat in an inert (argon) atmosphere at 550° C. for 2 hours. The coke product contained 13.3% S by weight as determined by x-ray analysis. The coke was activated as in Example 1 for 24 hours at 850° C. in a steam/argon mixture. The activated carbon product obtained in a yield of 37% had a surface area of 1105 m²/g and contained 6.8% by weight S as determined by x-ray analysis.

EXAMPLE 4

A mixture of 25% by weight of solid S and 75% by weight of a conventional 110° C. S.P. coal tar pitch was heated at 300° C. for one hour in a resin flask under an argon atmosphere. A pitch product containing 14.8% by weight S as determined by x-ray analysis was obtained in a yield of 84% based on starting weight of pitch+sulfur. The sulfur-containing polymeric pitch was heated rapidly to 500° C. in a ceramic boat under argon and held at 500° C. for one hour. The resulting coke residue obtained in 80% yield had a S content of 7.7% by weight as determined by x-ray analysis. The sulfur-containing coke was activated with a steam/argon mixture at 850° C. for 34 hours to give an active carbon in a 35% yield with a surface area of 1077 m²/g. When the same sulfur containing coke was activated in steam at 950° C. for a period of 2¼ hours, an active carbon product was obtained in 45% yield and the surface area was measured as 883 m²/g.

EXAMPLE 5 (Control)

A commercial petroleum coke containing about 4.0% by weight S which had been prepared by coking a high sulfur petroleum oil feedstock to about 500° C. was heated in a steam/argon atmosphere using a number of different time and temperature schedules. This high sulfur coke does not have a ladder polymer structure similar to the synthetic cokes produced in Examples 1–4. Attempted activation of this coke using similar conditions as those in Examples 1 to 4 produced active carbons with very low surface areas. Typical results follow. Heating the high sulfur coke in steam at 900° C. for 24 hours gave an activated carbon in 58% yield with a surface area of only 210 m²/g. Heat treatment of another portion of the coke at 960° C. in steam for 24 hours gave a product with a yield of 61% with a surface area of only 177 m²/g. By heating the coke in steam at 900° C. and burning off about 84% by weight of the carbon, an active carbon with a surface area of only 446 m²/g was obtained. The yield of this carbon was 16% based on the starting weight of coke. It is therefore evident that a high sulfur containing coke which does not have the ladder polymer structure will react with steam or oxygen but will not produce an active carbon with a very high surface area.

EXAMPLE 6

To evaluate the effectiveness of the high surface active sulfur carbon for gas storage applications, the effective storage was calculated using the definition of effective storage as the storage of gas at high pressure of 500 psig minus the storage of gas at a low pressure of one atmosphere, psig. This value would represent the amount of deliverable gas to an engine or other receiving means. The effective storage is calculated using the loading ratio correlation equation assuming that the active carbon can be compacted to a density of 0.85 g/cc or about 53 lb/ft³.

The loading ratio correlation (LRC) equation was used to evaluate methane loading of the active carbon of Example 3. The LRC adsorption isotherm equation is:

$$\frac{L}{Lo} = \frac{(K \times P)^{1/n}}{[(1 \times (K \times P)]} \quad 1/n$$

where
- L is the loading (milli-moles/g) at a given pressure, P, of methane,
- Lo is the maximum capacity of the active carbon adsorbent,
- K is the interaction coefficient and is a constant for a given temperature and carbon,
- n is a coefficient that measures the deviation from Langmuir behavior (LRC is based on the Langmuir adsorption isotherm in which n=1). The coefficient is a constant for a given carbon at a given temperature.

The LRC equation is for a single adsorbate, such as methane, at a constant temperature of 25° C. The loading of methane at 500 psig on the carbon was measured gravimetrically using the conventional McBain sorption balance technique.

The sulfur carbon of Example 3 with a surface area of 1105 m²/g was evaluated in this manner and the maximum loading capacity (Lmax) of the adsorbent was measured as 7.0 while the methane loading at 500 psi was found to be 5.24 milli-moles/g carbon. The methane loading efficiency of this carbon defined as the loading at 500 psi divided by the surface area was $$\frac{5.24}{1105} = 0.00474 \frac{\text{mmol}}{m^2}$$

The bulk density of the active sulfur carbon was measured as 1.14 g/cc. For comparison, a commercial active carbon Darco KB with a surface area of 1153 m²/g gave a lower value of Lmax=5.2 and a loading at 500 psi=4.28. The methane efficiency of this carbon was $$\frac{4.28}{1153} = 0.00371 \frac{\text{mmol}}{m^2}$$

The best known commercial active carbon for storage of methane (AX-21) was determined to have a methane loading efficiency of $$\frac{9.42}{2807} = 0.0036 \frac{\text{mmol}}{m^2}$$

In the present invention, a polynuclear aromatic hydrocarbon or an aromatic mixture, such as found in coal and petroleum tars and oils, can be used and the product from the reaction of aromatic precursor and sulfur can be coked in a separate step and then activated or can be directly activated with steam or $CO_2$ at 700°–1100° C. without prior coking. Also, activation can be achieved in addition to using $H_2O$, $CO_2$, air or mixtures thereof, by chemical activation using KOH, NaOH.

In the present invention, the reaction of sulfur with a pitch, tar or an aromatic hydrocarbon as described gives a sulfur containing coke in high yields of greater than 40% based on the combined starting weight of aromatic precursor and sulfur or greater than 60% based on the organic precursor alone. The aromatic precursors by themselves, without sulfur, give zero yields except for the pitch. The sulfur containing coke can be readily activated with steam or $CO_2$ to give an active carbon with a high surface area greater than 1000 m²/g while typical commercial cokes without sulfur treatment cannot be readily activated with steam or $CO_2$ to give a high surface area carbon. By incorporating sulfur into the active carbon structure as in the present invention, the active carbon becomes much more polar and can exert a stronger attraction for molecules such as methane, e.g. approximately three times stronger for sulfur than for carbon. By using sulfur treated cokes in accordance with the present invention, active carbons can be made in high yields from hydrocarbon materials rather than from conventional oxygen containing materials such as cellulose, coconut shells and olive pits which are low in carbon.

Cokes have been used to produce active carbon but only by using costly and difficult to control chemical process techniques (reaction with alkali hydroxides at high temperatures). The sulfur treated cokes in the present invention in contrast can be activated by using much more economical and conventional activation processes with steam or $CO_2$.

Although the present invention has been described with reference to particular details, it is not intended that these details shall be construed as limiting the scope of the invention.

What is claimed:

1. A process for storing methane which comprises the steps:

(a) reacting at least one carbonizable liquid or carbonizable melted solid material selected from the group consisting of polynuclear aromatic hydrocarbons, pitches, oils, and tars with elemental sulfur in an amount of 10 to 40 percent by weight based on the weight of the selected carbonizable material to obtain a polymeric reaction product in the form of non-planar ladder polymer containing sulfur in the amount of 5 to 20% by weight;

(b) heating the reaction product of step (a) at a temperature from 450° C. to 1000° C. in an inert atmosphere for a time period sufficient to produce a sulfur-containing coke containing 5 to 15% by weight sulfur;

(c) heating the sulfur-containing coke of step (b) at a temperature of at least 500° C. in an oxidizing atmosphere for a time period sufficient to produce activated carbon containing 4 to 10 percent by weight sulfur and having a surface area of at least 600 $m^2/g$, said activated carbon having a methane storage capacity of at least 4 mmole of methane per gram of activated carbon at 500 psi; and (d) contacting said activated carbon with methane at high pressure so that the activated carbon is loaded with methane at 500 psi to the extent of at least 4 mmole of methane per gram of activated carbon.

* * * * *

UNITED STATES PATENT AND TRADEMARK OFFICE
CERTIFICATE OF CORRECTION

PATENT NO. : 5,639,707
DATED : June 17, 1997
INVENTOR(S) : I.C. Lewis et al It is certified that error appears in the above-identified patent and that said Letters Patent is hereby corrected as shown below:

Claim 1, line 24, delete:

"at 500 psi to the extent of at least 4 mmole of methane per gram of activated carbon"

Signed and Sealed this

Seventeenth Day of November, 1998

*Attest:*

BRUCE LEHMAN

*Attesting Officer*      Commissioner of Patents and Trademarks